US006373376B1

(12) United States Patent
Adams et al.

(10) Patent No.: US 6,373,376 B1
(45) Date of Patent: Apr. 16, 2002

(54) AC SYNCHRONIZATION WITH MISWIRE DETECTION FOR A MULTI-NODE SERIAL COMMUNICATION SYSTEM

(75) Inventors: John T. Adams, Minneapolis; Steven C. Nichols, Maple Grove; Edward L. Schwarz, Minneapolis, all of MN (US)

(73) Assignee: Honeywell International Inc., Morristown, NJ (US)

( * ) Notice: Subject to any disclaimer, the term of this patent is extended or adjusted under 35 U.S.C. 154(b) by 9 days.

(21) Appl. No.: 09/658,794

(22) Filed: Sep. 11, 2000

(51) Int. Cl.[7] .............................................. H04M 11/04
(52) U.S. Cl. ........................... 340/310.01; 340/310.04; 340/310.05; 370/333; 370/400; 370/522; 710/9
(58) Field of Search ....................... 340/310.01, 310.02, 340/310.04, 310.05, 310.06; 370/300, 333, 400, 447, 461, 462, 509, 522; 710/9, 104

(56) References Cited

U.S. PATENT DOCUMENTS

| 5,323,385 A | * | 6/1994 | Jurewicz et al. ............ 370/300 |
| 5,551,053 A | * | 8/1996 | Nadolski et al. ................ 710/9 |
| 5,553,070 A | | 9/1996 | Riley ........................ 370/85.1 |
| 5,631,854 A | | 5/1997 | Riley .......................... 364/572 |
| 5,640,511 A | | 6/1997 | Botzenhardt et al. ..... 395/185.1 |
| 5,675,830 A | * | 10/1997 | Satula ............................ 710/9 |
| 5,684,343 A | | 11/1997 | Riley .......................... 307/127 |
| 5,691,659 A | | 11/1997 | Riley .......................... 327/143 |
| 5,748,616 A | | 5/1998 | Riley .......................... 370/242 |
| 5,764,647 A | | 6/1998 | Riley .......................... 370/489 |
| 5,870,401 A | | 2/1999 | Riley .......................... 370/489 |
| 5,897,600 A | | 4/1999 | Elmore et al. ................ 701/50 |
| 5,901,156 A | | 5/1999 | Botzenhardt et al. ......... 371/32 |
| 5,907,539 A | | 5/1999 | Riley .......................... 370/282 |
| 5,970,251 A | | 10/1999 | Zimmerman et al. ....... 395/709 |
| 6,111,888 A | * | 8/2000 | Green et al. ................ 370/461 |

* cited by examiner

Primary Examiner—Edward Lefkowitz (57) ABSTRACT

A controller area network (CAN) has a plurality of nodes connected to transmit and receive data over a serial data line. An AC power source is also connected to each node. Each node senses the AC power waveform and synchronizes bit transmission and bit detection with the waveform. In a preferred embodiment, each node includes a circuit that detects zero crossings by the AC waveform, providing two accurately synchronized bit intervals per complete AC cycle. A preferred version of the invention includes hardware and software that detects miswires of the node to the data and power lines.

15 Claims, 5 Drawing Sheets

AC SYNCHRONIZATION WITH MISWIRE DETECTION FOR A MULTI-NODE SERIAL COMMUNICATION SYSTEM

BACKGROUND OF THE INVENTION

Many of today's systems require flexible communication between a number of cooperating electronic nodes or modules, each having a microprocessor and one or more microcircuits. To avoid the need for a large number of individual conductors between each pair of nodes, serial transmission on a single data path is preferred. It is possible to connect each node with every other node, but once there are more than a few nodes, the connections become complex and expensive. For this reason, such connectivity structure is not particularly desirable. A number of communication protocols have been developed to deal with situations having many nodes and high message and data rates. Ethernet and the Internet are just two of the better-known serial transmission protocols having high data and message capacities. Unfortunately, these high capacities come at relatively high cost and complexity as well. These systems have relatively expensive individual nodes with high processing speeds justifying fast (and expensive) internode communication.

For communication systems having a relatively large number of nodes and relatively low message and data rates, it is economical and efficient to use a protocol providing each node with an inexpensive interface circuit. All of the interface circuits are connected to a single conductor pair, so each node can both transmit and receive on this conductor pair. The steadily falling cost of microprocessors and microcircuits generally, allows inexpensively creating such networks having scores or even hundreds of such nodes. One particular form of such a network uses the so-called CAN (controller area network) protocol. The CAN protocol establishes a mechanism for dealing with so-called collisions, which is the situation where a number of nodes transmit simultaneously.

In the CAN protocol, all of the nodes are connected to a single conductor pair. Data is transmitted from one node to all of the others in messages carried serially on the conductor pair. The messages are binarily encoded in the voltages on the conductor pair. Each message has a leading ID code that uniquely identifies the message, followed by a number of other fields of assigned length. The information in these fields includes the message length and the data itself. The CAN protocol uses hardware that treats one of the voltage levels assigned to one of the binary bit values as what is called dominant, the other recessive. Should two or more nodes transmit simultaneously causing colliding messages, a dominant voltage level transmitted by any node causes the conductor pair to carry a dominant voltage level during that time regardless of the number of other nodes simultaneously transmitting a recessive level. Each node monitors the signals carried on the conductor pair at all times. The nodes are programmed to transmit messages with prearranged ID codes.

Each node is programmed to continuously sense the message traffic on the conductor pair. When a node is not transmitting and detects in a message, an ID code to which it is programmed to respond, the node receives the message following and responds appropriately. While a node is transmitting, it continues to sense the signal on the conductor pair. When a node, during a bit time, is transmitting a recessive voltage and senses the voltage signal carried on the conductor pair is dominant, that means that a message collision is occurring, and the node transmitting the recessive voltage signal ceases transmitting. If two or more nodes are transmitting dominant voltage levels simultaneously, it may take several bit times before all of the collisions have been resolved. By assigning unique (to that node) leading ID codes for all of the messages sent by all of the nodes, eventually every node but one will detect a difference between its transmitted signal voltage and the conductor pair signal, leaving just that one node to transmit the remaining portion of its message. U.S. Pat. Nos. 5,001,642 and 5,303,348 describe the CAN protocol in more detail.

One advantage of the CAN protocol is the possibility for providing power conductors that many nodes can share. For example, the CAN protocol as originally conceived allows a pair of DC power conductor to be routed to each node along with the data conductors. It may even be possible in certain systems for data and power to share one or more common conductors. Thus, a four or even three wire bundle connecting all of the nodes can provide both power and communication for them.

As mentioned, some of these systems may have a large number of nodes. Miswiring during system assembly, or operational defects of an individual node after installation, creates a significant failure diagnosis problem. When reduced capability node hardware is involved, there is less opportunity for node-assisted diagnosis of node and system operating status. There may not be any sort of device in the node allowing human input signaling status of the nodes or changing node operation to assist trouble-shooting. Test instruments can detect failures in individual nodes of course, but this may require that the node be detached from the system, and of course requires either having a tester handy or calling a technician.

On a different point, certain distributed control systems, for example these used to control HVAC systems, have very low data rate requirements. Traditionally, these systems are designed to operate, in the U.S. anyway, with 60 Hz., 24 v. AC power. Conventionally, control elements such as thermostats, burner controls, and humidistats control the switching of power to the remotely sited air conditioners, furnaces, humidifiers, and blowers of the HVAC system.

BRIEF DESCRIPTION OF THE INVENTION

We have developed a unique system employing certain principles of CAN architecture. This unique system provides advantages over the conventional system structure and yet easily integrates with a conventional and existing system. A number of novel features in this unique system assist in achieving this easy integration and enhance operation relative to these existing systems.

One of these features allows each of the nodes in the system to receive operating power from low voltage AC power, and at the same time use the 50 or 60 Hz. AC waveform for synchronizing the start of each bit interval for each node. In one embodiment, the two zero crossings of the power waveform per cycle synchronize the starts of 100 or 120 bit intervals each second. Such a system has a plurality of nodes for communicating with each other through messages encoded in a data signal comprising a series of data bits sent and received on a data line respectively to and from a data terminal of each node connected to the data line. The data bits are encoded in dominant and recessive signal levels corresponding to binary values and by which each said node resolves collisions of messages sent by more than one node. Each said node receives an AC waveform at an AC power terminal from an AC power line.

Each node includes a power supply for providing DC power at first and second DC power terminals for operating the node and for communicating through the data line with the other nodes. The second DC power terminal voltage level corresponds to the dominant signal level. Each node has an interface circuit comprising i) a pull-up impedance connected between the first DC power terminal and the node's output data terminal, and ii) a variable impedance connected between the node's output data terminal and the second DC power terminal. Each interface circuit has a control terminal. The variable impedance in each interface circuit provides a first impedance value substantially smaller than the pull-up impedance value responsive to an output data signal at the control terminal having a first level, and an impedance substantially larger than the pull-up impedance value responsive to a second level of the output data signal at the control terminal. The variable impedance's first impedance value holds the data line voltage level substantially at the dominant signal level irrespective of the impedance of the variable impedances in other nodes.

Each node has a phase detector receiving the AC power terminal waveform and providing a synchronizing signal having level changes in predetermined time relationship to predetermined points in the AC power terminal waveform. A signal generator in each node receives the synchronizing signal and provides the output data signal to the control terminal. Typically, the signal generator will be a microprocessor. The generator changes the output data signal level in predetermined time relationship to the level transitions in the synchronizing signal. With all the nodes using the same AC waveform to synchronize data transmission, it is easier to resolve message collisions.

Another advantage of this feature is that three wires are sufficient to carry both data and power to each of the nodes. By adding a rectifying power supply to each node, the AC lines can provide DC power for operating the node and for transmitting data on the data path.

These synchronized nodes can include in each of them, inexpensive features that are very helpful in diagnosing a number of different system problems arising from either miswiring or from node or connection failures, and in monitoring and analyzing operation of the node. By proper powering of an indicator element such as an LED, it is possible to signal so a human can infer operating status and modes for each of the nodes. One aspect of our invention provides analytical tools that automatically perform fault diagnosis and operating analysis for the installer or service person.

Even though the nodes are connected by only three lines, it is still possible to miswire a node to the system. We have devised fault diagnosis software and hardware that operate cooperatively to detect such miswires and provide an indication of them to humans.

Two types of miswires can occur. In the first, the data path is connected to the AC power terminal from which the synchronizing signal is taken. Software uses the internal microprocessor clock to measure the times between the level changes in the synchronizing signal. When these are outside an expected range, this first type of miswire may exist. The reason is that a data signal's level changes will not mirror that of the AC waveform. We use a different testing procedure to detect when the data line is connected to the other AC power terminal. In this case, an AC line is connected to provide the AC waveform at the data terminal. The AC waveform appears to be a uniform train of high and low voltage levels, which is different from a normal data signal. This situation can also be detected with software by using the internal microprocessor clock.

A first concern in detecting miswires is that the miswired node receives AC power. In our system, the rectifying power supply in each node comprises first through fourth diodes forming a bridge circuit. To provide operating power for the node, the node has fifth and sixth diodes connecting the data terminal in bridge configuration to the first and second DC power terminals. By bridge configuration, we mean that the fifth and sixth diodes are connected between the data terminal and the DC lines so that DC power is still supplied to the DC power terminals even if one of the AC power terminals is connected to the data path rather than to AC power.

A first error indicator provides a humanly discernable error indication responsive to a first error signal. Typically, this indicator will comprise an LED controlled by a microprocessor to flash in a certain pattern. A synchronizing signal tester receives the synchronizing signal and measures interval lengths between successive synchronizing signal level changes. The signal tester compares these measured interval lengths with a predetermined range of interval lengths, and provides the first error signal to the first error indicator responsive to a measured interval length falling outside of the predetermined range of interval lengths.

A second error indicator provides a humanly discernable error indication responsive to a second error signal. The second error signal in dictates the miswire of the data line to the AC power terminal not furnishing the synchronizing waveform. A data value tester receives the data signal and if the sequence of level changes in the data signal suggests that the data signal is in fact the AC waveform, supplies the second error signal to the second error indicator. As mentioned, an AC waveform applied to the data terminal of the node has a detectable pattern.

One version of this data value tester tests for a long train of alternating high and low logic levels at the data terminal, each of these alternating levels persisting for a single bit interval. The data value tester includes a memory element recording data signal levels responsive to a bit value signal. A counter element in each data value tester records a count value and providing a count signal encoding the count value. The count value is altered by a predetermined delta value responsive to an alter count signal, and sets to a predetermined cleared value responsive to a clear count signal.

An analyzer element receives the data signal and the synchronizing signal, and responsive to level changes in the synchronizing signal providing an alter count signal to the counter element. The analyzer element compares the most recent level of the data signal to the data signal level recorded in the memory element, and if logically identical, providing a clear count signal to the counter element. Then the analyzer element provides a bit value signal to the memory element encoding the most recent level of the data signal.

A comparison element receives the count signal and provides a second error signal to the second error indicator responsive to the count value encoded in the count signal reaching a predetermined fault value different from the cleared value.

Another diagnostic or analytical feature is an indicator element that provides a human perceptible indication whenever and only when the node in which the element is present is actively transmitting on the data line. This feature is not limited to systems receiving AC waveforms for either synchronization or power, but is intended for systems connected by a power line, a data line, and a common line. Each node has an interface circuit for connecting to the data and common lines. The system includes at least one pull-up resistor connected between the power and the data lines.

The nodes each have an interface circuit having an isolation element having a first terminal connected to the data terminal and a second terminal. Each module also has a switch for connecting the isolation element's second terminal to the common conductor responsive to a first level of a local data signal and for disconnecting the isolation element's second terminal responsive to a second level of the local data signal. An indicator element in each module is connected between the power conductor and the isolation element's second terminal. The indicator element includes a preselected impedance. When the switch is conducting and there is power applied to the indicator element, the indicator element provides a human perceptible indication while the switch is closed. If the element is a light-emitting diode, the indication is the light emitted. If the element is a sound generator, then the module will generate a characteristic sound when the switch is closed.

DESCRIPTION OF THE PREFERRED EMBODIMENTS

Figure 1:
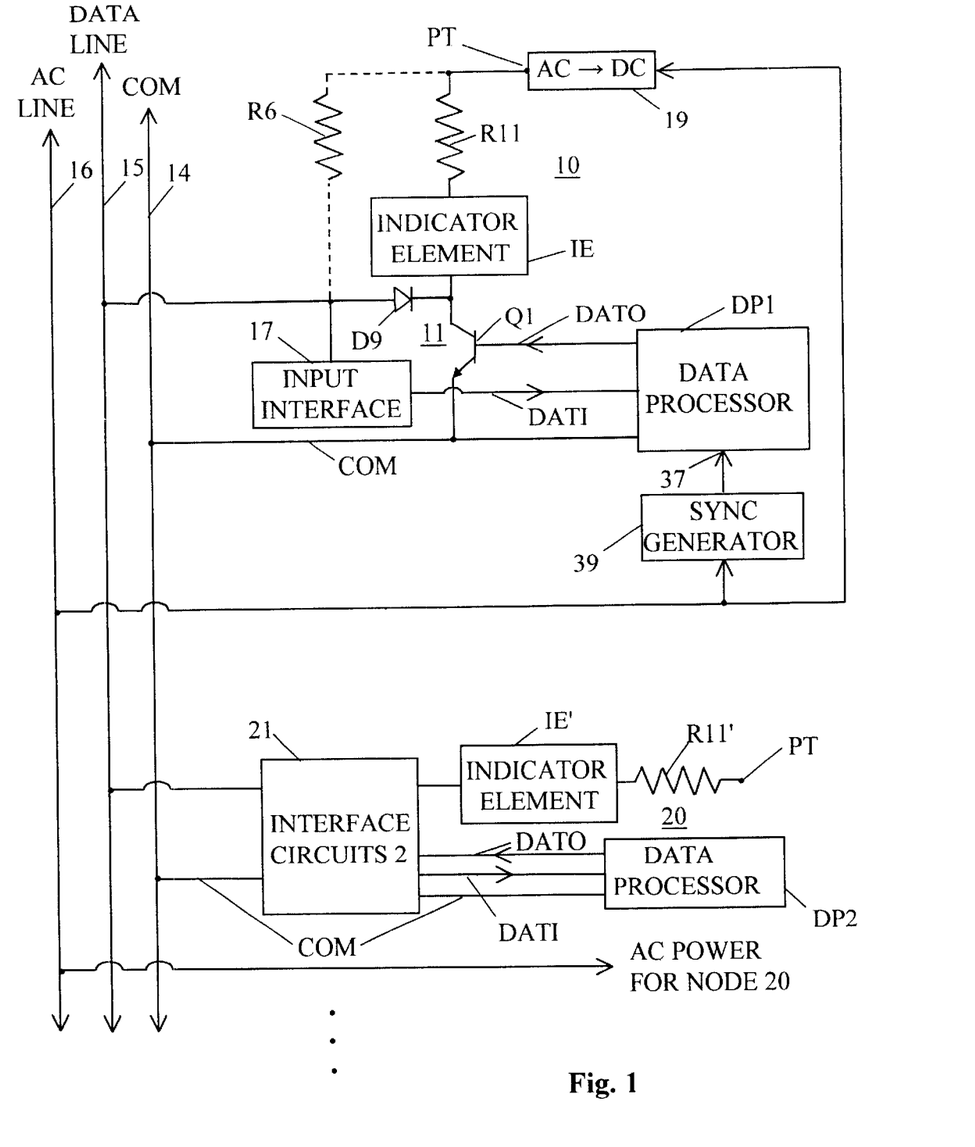
FIG. 1 shows the diagram of a simplified system disclosing the basic features of the invention.

The simplified system diagram of FIG. 1 shows two individual nodes 10 and 20 that can compatibly communicate with each other through data line 15. An AC line 16 is connected to a sync generator 18 and an AC to DC converter 19 in node 10 and similar circuits in node 20. The three vertically aligned dots below node 20 indicate that more nodes similar to nodes 10, 20, etc. may be placed on data line 15. Node 10 includes an output interface circuit 11, an input interface circuit 17, and a data processor DP1. Node 20 and other nodes have similar components. The individual interface circuits 11 and 17 are intended to connect data processor DP1 through data line 15 to permit communication to the other data processors DP2 of node 20, etc. Data processors DP1, DP2, etc. may be any type of processor or controller convenient for operating or controlling electromechanical devices such as valves, relays, motors, etc. The simplified output interface circuit 11 of FIG. 1 includes only resistor R6, diode D9, and transistor Q1. A commercial version will usually have more components.

In a typical system it is possible or even likely that a dozen or more nodes 10, 20, etc. may be connected to lines 15 and 16. In some cases nodes 10, 20, etc. will be electrically identical, but this is not a necessity. Compatible rather than electrically identical nodes 10, 20, etc. may be less costly or more convenient in a particular system. For example, the processing requirements of a particular system component served by a node 10 may be so different from other components that it is sensible to upgrade or downgrade the capability of that node. However, node 10 and interface circuit 11 are representative of the individual nodes and interface circuits as far as the features of this invention are concerned. Nodes 10, 20, etc. can be used to implement a version of the CAN protocol, in that any of them can propagate dominant and recessive voltage levels and bit values and detect and resolve message collisions, as discussed in the "Background" section.

Circuit 11 will function with a number of arbitrary power and signal levels and polarities. Like many electrical and electronic devices, those incorporating the invention can be implemented in many different ways. These alternative embodiments are to be included within the general inventive concepts.

Circuit 11 is intended to operate with DC power provided across power terminal PT and common line 14 by a power supply, shown here as an AC to DC converter 19. Converter 19 provides operating power for data processor DP1 as well, over conductors not shown. At least one of the circuits 11, 21, etc. must have a pull-up resistor R6 for holding the signal on data line 15 at the recessive value when none of the interface circuits are propagating a dominant signal voltage. Depending on the relative levels of the dominant and recessive voltages, resistor R6 may as easily "pull up" the data line 15 voltage to a lower as to a higher voltage. In this embodiment, the recessive signal value may be a relatively high voltage, perhaps +8 v. above the voltage on common line COM. The relatively low voltage dominant value on data line 15 may be from 0 to 3 v. above the common line 14 voltage.

When a single output interface circuit 11 of a node 10 places a low voltage dominant signal on data line 15, then data line 15 carries the low voltage level dominant signal value irrespective of the number of circuits 11 placing the high voltage recessive signal on line 15. In point of fact, only a single one of the nodes 10 need have a circuit 11 with the pull-up resistor R6, and for this reason resistor R6 is shown with dotted line connections to the circuit.

Data processor DP1 provides an output data signal to interface circuit 11 as a varying voltage across an output data line DATO and the common line COM. Input interface circuit 17 converts the data encoded in voltage levels on data line 15 to an input data signal encoded in varying voltage levels across input data line DATI and the common line COM suitable for data processor DP1. Similar input and output interface circuits forming element 21 provide data from data line 15 to processors DP2, provide data from processor DP2 to data line 15, and receive DC voltage at terminal PT.

AC line 16 carries an AC waveform to all of the nodes 10, 20, etc. In a preferred embodiment, a sync signal generator 39 receives the AC voltage and provides a zero crossing (ZC) signal to a sync terminal 37 of microprocessor μP. The ZC signal has a level change close to the zero crossing point of each cycle of the AC waveform. Generator 39 cooperates with microprocessor μP and instructions executed from memory IM to form a phase detector that generates internal to microprocessor μP, a synchronizing (sync) signal having a level change at a predetermined point in the AC waveform. Microprocessor μP synchronizes changes in voltage level on output data line DATO with the level changes in the sync signal. Since each node 10' performs its synchronization in exactly the same way and uses the same AC waveform, all of the nodes 10' in a system have voltage level changes on their output data line DATO in synchronization with each other. This simplifies collision detecting. In our preferred embodiment, the sync signal level changes within a few tens of microseconds after each zero crossing of the AC waveform, or twice in each complete AC cycle. This conveniently provides two bits per cycle, or 120 bits per sec.

when using 60 hz. AC power. It is easy to design phase detectors using either software executed by microprocessor μP or hardware to provide multiples of two level changes per cycle.

Nodes in our system include a resistor R11 having a first terminal connected to the power terminal PT and a second terminal connected to the first terminal of an indicator element IE. An isolation element comprises a diode D9 with its anode connected to data line 15 and its cathode connected to a second terminal of indicator element IE. An output transistor Q1 has its collector connected to the second terminal of indicator element IE and the cathode of diode D9. The transistor Q1 emitter is connected to the common line COM. The base terminal of transistor Q1 is connected to the output data line DATO so that the voltage provided by data processor DP1 controls the impedance of transistor Q1.

When the voltage on data line DATO is low, transistor Q1 does not conduct, and the transistor Q1 collector cannot affect the voltage on line 15. With transistor Q1 nonconductive, resistor R6 holds line 15 at the high voltage level. When the voltage on data line DATO is high, transistor Q1 conducts. If the voltage on data line 15 has previously been high, diode D9 is forward biased into conduction, pulling down the voltage on line 15 to one diode drop or about 0.7 v. above the voltage on common line COM, which is the low, dominant value. The data line 15 voltage has previously been high only if the transistors Q1 in all other of the interface circuits 21, etc. are not conducting. With transistor Q1 in circuit 11 conducting, current also flows through resistor R11 and indicator element IE, causing element IE to provide an indication that data processor DP1 is sending a dominant value on line DATO. On the other hand, if data processor DP1 is sending a recessive value (high voltage on line DATO) and another data processor say processor DP2 for example, is sending a dominant value which pulls the voltage on line 15 to the dominant (low voltage) level, the isolation element diode D9 prevents current from flowing through element IE in node 11. Thus, indicator element IE in a particular processor DP1, DP2, etc. receives current and provides an indication only when the associated data processor is sending a dominant signal value.

The indication element IE provides may be valuable during installation and repair of these systems. If a processor DP1 is improperly sending either dominant or recessive signals, the indication from element IE often simplifies troubleshooting. For example, if testing shows that data lines 14 and 15 are shorted to each other, and yet no indication is present from element IE in any interface circuit 11, then the problem will often be a short between the common line 14 and the data line 15 rather than in one of the interface circuits 11, 21, etc. On the other hand, if transistor Q1 locks in conduction in one of the interface circuits 11, 21, etc., the indicator element IE for that circuit 11, 21, etc. will constantly provide an indication which can indicate the source of the problem. Since indicator element IE provides an indication whenever transistor Q1 conducts, and since the data rates are quite slow, often the rate of the indication from element IE allows a service person to infer the activity mode of the node 10 involved, which may simplify error analysis.

Figure 2:
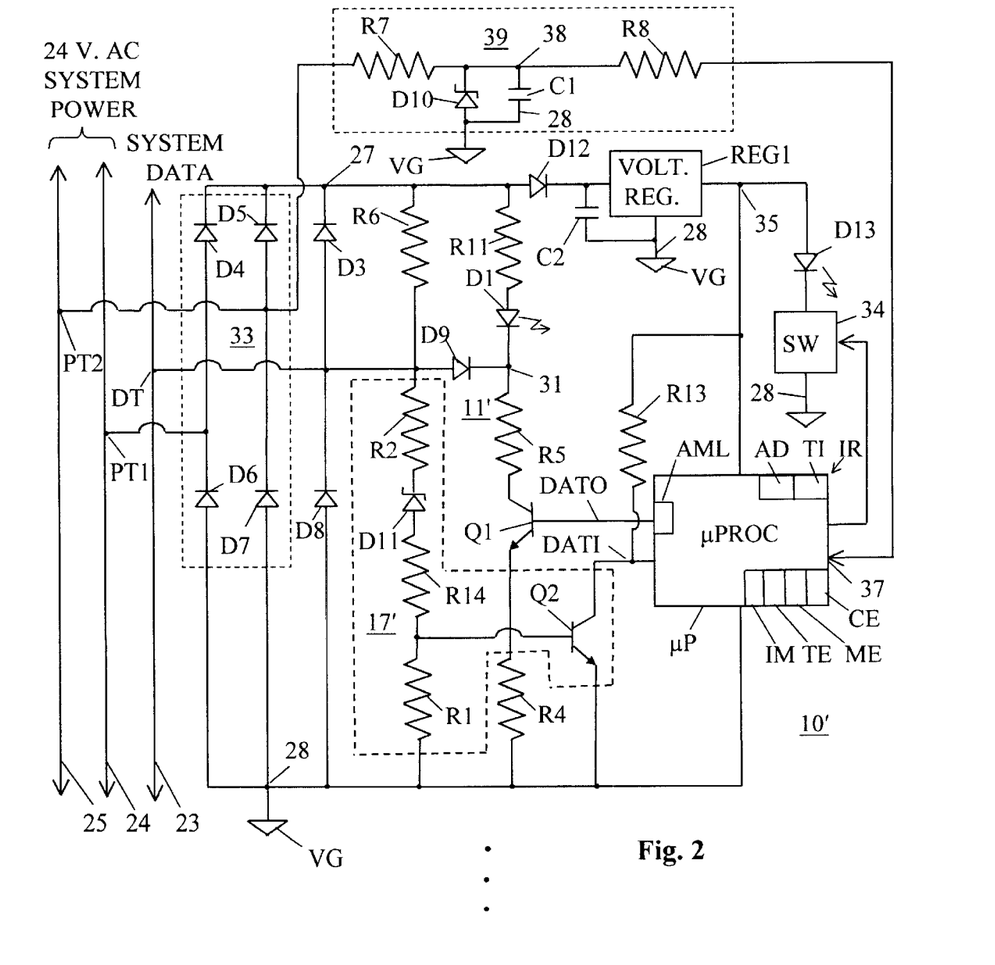
FIG. 2 is a circuit diagram of a preferred module of the system including an interface circuit and a microprocessor implementing the invention.

FIG. 2 is a commercial version of a node 10' having an output interface circuit 11' similar to that shown in FIG. 1, and an input interface circuit 17'. Circuit components in FIG. 2 serving functions similar to components of FIG. 1 have the same reference numbers, perhaps bearing the "prime" suffix if not identical. Again, the aligned vertical dots above and below node 10' indicate that a typical system will comprise number of nodes 10' each including an interface circuit 11' similar or identical to and compatible with each other.

In FIG. 2, interface circuit 11' includes resistors R5 and R6, transistor Q1, and diode D9. The individual interface circuits 11' each have a pair of power terminals PT1 and PT2 connected to AC power lines 24 and 25 respectively. Each circuit 11' also has a data terminal DT connected to a data line 23 roughly corresponding to the data line 15 of FIG. 1. The data processor DP1 of FIG. 1 is shown as microprocessor μP in FIG. 2. Microprocessor mP may comprise any of the small microprocessors widely available, and includes suitable instruction memory IM in which is stored firmware for controlling microprocessor operation.

The instruction memory IM holds the various instructions whose execution causes microprocessor μP to control and operate the system, including implementation of the inventive features. During execution of these instructions, microprocessor μP or individual elements of it become the functional equivalent of many of the various elements or components comprising the invention. Some of these components are shown symbolically as a part of microprocessor μP. Among these are:

An alterable memory location AML that temporarily stores data provided to the output data terminal DATO A timing element TE capable of signaling that a predetermined time period has elapsed Memory elements ME comprising several data storage locations of a random access memory (RAM), a usual microprocessor component A counter element CE that comprises one or more RAM locations whose contents are changed by executing a series of instructions Microprocessor μP also includes an interrupt register IR having a time interval field TI that can be set to any of a range of numeric values, and an address field AD that can be set to an interrupt address of instruction memory IM. Every numeric value in field TI corresponds to a time interval. When a value is entered in field TI, microprocessor μP periodically decrements the value, reaching zero at the end of the time interval assigned to that value. When zero is reached, the next instruction executed is at the interrupt address in the address field AD. The precision of the time measurement in the interrupt for these small microprocessors is typically low and can vary from unit to unit. It is reasonable to design a system to tolerate an error of +10% from the nominal time value specified in field TI, at which the interrupt occurs.

The following Table I lists component values suitable for proper operation of the FIG. 2 module. Many other sets of component values are equally suitable. However, certain relative values are important, and these will be identified during the explanation of circuit operation.

TABLE I

| Resistor R1 | 10 KW |
| Resistor R2 | 51 KW |
| Resistor R4 | 22 W |
| Resistor R5 | 22 W |
| Resistor R6 | 10 KW |
| Resistor R7 | 100 KW |
| Resistor R8 | 100 KW |
| Resistor R11 | 10 KW |
| Resistor R13 | 10 KW |
| Resistor R14 | 2 KW |
| Zener diode D10 | 8.2 v. reverse voltage drop |
| Zener diode D11 | 6.2 v. reverse voltage drop |
| Capacitor C1 | .01 μfd. |

A bridge rectifier 33, a voltage regulator REG1, a diode D9, and a capacitor C2 together provide the function of power supply 19 in FIG. 1. Rectifier 33 comprises diodes D4–D7, and receives at input terminals PT1 and PT2, the 24 v. 60 Hz. AC power provided on power lines 24 and 25. The bridge rectifier diodes D4–D7 provide unfiltered full wave rectified DC power to lines 27 and 28, with line 27 positive with respect to line 28. The DC power on lines 27 and 28 is filtered by diode D9, capacitor C1, and voltage regulator REG1, and provided on a DC power line 35 to operate microprocessor mP and LED D13.

A discussion of voltage levels is in order at this point. Terminal 28 connects to a virtual ground VG for both power and data. Signal and power voltage levels are referenced to terminal 28 by the various circuit components, and discussion of voltage levels which follow use this convention. Thus, the voltage at terminal 28 is defined as 0 v., and corresponds to a low logic voltage level. Voltage levels carried on data line 23 and applied to terminal DT are either low, approximately 0 v. or high, typically +5 to +8 v. DC. As mentioned already, high logic level voltage serves as the recessive logic value for purposes of resolving collisions.

Data signals at terminal DT are provided to the anode of diode D9. Diode D9 serves the same isolation function as in FIG. 1. A pull-up resistor R6' is connected between line 27 and terminal DT. Resistor R6' applies the unfiltered DC voltage of line 27 on terminal DT to form the high logic level voltage unless other components in this or another interface circuit 11' are pulling the terminal DT voltage low. The cathode of diode D9 is connected to a terminal 31. A first terminal of a resistor R5 is also connected to terminal 31. The second terminal of resistor R5 is connected to the collector of transistor Q1. The emitter of transistor Q1 is connected to a first terminal of a resistor R4, and the second terminal of resistor R4 is connected to line 28. The base of transistor Q1 is connected to output data line DATO of microprocessor mP. The voltage that line DATO provides is controlled by the data value stored in memory location AML. When the data value in location AML places a low voltage level on line DATO, the impedance of transistor Q1 is very high and essentially no current flows through resistors R5 and R4. When transistor Q1 impedance is high, the DC voltage carried on path 27 is applied to data terminal DT by pull-up resistor R6' to form a logical high voltage level on terminal DT. When the voltage that memory location AML places on line DATO is high, the impedance of transistor Q1 becomes very low, allowing relatively high current flow through transistor Q1 and resistors R5 and R4. When transistor Q1 conducts, resistors R5 and R4 form a voltage divider with resistor R6. Since the series resistance of resistors R5 and R4 is very low relative to the value of resistor R6, the voltage at terminal 31 is pulled to very near 0 v. The low voltage at terminal 31 pulls the voltage at terminal DT through diode D9 to slightly more than one diode drop above 0 v. The impedance and current-carrying capacity of transistor Q1 and diode D9 is sufficient to pull the terminal DT in every other node 10' attached to line 23 to the same one diode drop above 0 v. level as well. In this way interface circuit 11' permits microprocessor μP to transmit or propagate a logical low voltage level to every other node 10' connected to data line 23.

Input interface circuit 17' provides to input data line DATI of microprocessor μP, the logical equivalent of the logic level voltage present on data line 23. A series voltage divider circuit comprising zener diode D11 and resistors R2, R14, and R1 drops the data terminal DT voltage to a value suitable for controlling the impedance of transistor Q2. (We note that in our preferred embodiment, it is best to provide transistor Q2 as part of a single microcircuit package that includes resistors R1 and R14 and provides no direct connection to the base of transistor Q2. From a circuit operation standpoint, resistor R14 is unnecessary or its value included in resistor R2, and may be replaced with a simple direct connection between the diode D11 anode and the base of transistor Q2.) Voltage provided by this voltage divider circuit is applied to the base of transistor Q2. The collector of transistor Q2 is connected directly to input data line DATI of microprocessor μP and through a resistor R13 to DC power line 35. The emitter of transistor Q2 is connected to virtual ground line 28. A logical high voltage at data terminal DT causes a relatively high positive voltage at the base of transistor Q2, and transistor Q2 conducts. This pulls the voltage on data line DATI low. A logical low data terminal DT voltage results in a relatively low positive voltage at the base of transistor Q2, cutting transistor Q2 off. This allows resistor R13 to pull the voltage on input data line DATI high. In this way, microprocessor μP receives on input data line DATI an inverted value of the signal present at data terminal DT.

This system uses the AC waveform to synchronize individual bit intervals for each node 10' connected to lines 23, 24, and 25. Each node 10' is designed to transmit 120 bits per sec. (bps) using each zero crossing of the 24 v. AC 60 Hz. power waveform to signal the start of a bit interval. One advantage of using each zero crossing (or the peak voltage in each half cycle), is that synchronization occurs irrespective of the whether terminals PT1 and PT2 in a particular node 10' are connected as shown to lines 24 and 25 respectively or permuted with terminals PT1 and PT2 connected to lines 25 and 24 respectively.

A zero crossing detector 39 provides a synchronizing (sync) signal adequate to signal the start of each bit interval. Detector 39 includes resistors R7 and R8 along with zener diode D11 and capacitor C1. A terminal of resistor R7 is connected by line 38 to a terminal of resistor R8 to form a series resistor circuit. This series resistor circuit is connected between power terminal PT2 and microprocessor sync signal terminal 37. A zener diode D11 connected between connector line 38 and ground line 28 limits the voltage at line 38 to a maximum of the diode D1 reverse voltage drop (see Table I) and a minimum of one diode drop below the ground voltage on line 28. One diode drop below 0 v. will adequately function as a low logic level.

Consider one complete AC cycle applied to terminals PT1 and PT2. As terminal PT2 and line 38 become positive with respect to line 28, voltage at line 38 rises to the reverse voltage drop of zener diode D10 and is held there by diode D10 as long as the voltage at terminal PT2 is greater than the diode D10 reverse voltage drop. When the voltage at line 38 falls below the reverse voltage drop of diode D10 and then below the ground voltage near the end of the first half of the AC cycle and then during the entire second half of the AC cycle, diode D10 becomes forward biased. While diode D10 is forward biased, the voltage at line 38 is clamped to one forward diode drop, typically 0.7 v., below the line 28 voltage. Capacitor C1 filters the voltage on line 38, removing any spikes and surges, so that line 38 voltage cleanly transitions between the high and the low voltage levels. (As will be become clear below, it is not essential for the transitions of the voltage at terminal 37 to be precisely square.) The value of the diode D10 reverse voltage drop should be selected to be compatible with both the maximum high logic level voltage allowable for microprocessor μP, and the high logic to low logic level transition voltage for microprocessor μP. These values depend on the microprocessor design selected. A suitable reverse voltage drop value for diode D10 for microprocessors having high to low logic transition voltage in the range of 3–4 v. is the 8.2 v. shown in Table I above for diode D10.

The Voltage of line 38 is applied through current-limiting resistor R8 to terminal 37 of microprocessor mP. The two logic voltage levels indicated for line 38 are adequate to function as high and low logic levels for microprocessor mP. Each time the voltage at terminal 37 changes from a high to a low logic level or a low to a high logic level, a zero crossing has just occurred. By frequently sampling the voltage at terminal 37, microprocessor mP can detect the time of each zero crossing with precision adequate to synchronize a node 10' with all other nodes 10' connected to power lines 24 and 25 and with data line 23.

The function of the FIG. 1 indicator element IE is provided in the FIG. 1 circuit by an LED (light-emitting diode) D1 connected between current-limiting resistor R11' and terminal 31. Considering a single one of the nodes 10', when transistor Q1 conducts, current flows to the LED D1 in that node 10', causing LED D1 in that node 10' to emit light. Diode D9 in its node 10' is back biased by a conducting transistor Q1 in every other node, preventing a conducting transistor Q1 in another node from causing diode D1 in a particular node 10' to conduct and emit light. Thus, diode D9 serves as an isolation element allowing only current flow through transistor Q1 in a particular node 10' to provide current for causing LED D1 in that node 10' to emit light.

As mentioned in the explanation of FIG. 1, one concern in this communication system is miswiring. Where a system has perhaps scores of nodes scattered throughout a large building, it is easy for an installer to make a mistake when connecting conductors 23, 24, 25 to node terminals DT, PT1, PT2. We find that it's useful for a node 10' to indicate a miswire condition. In order for this to be possible, it is necessary for the node to receive power from power lines 24 and 25. With the two power lines 24 and 25 and the one data line connecting all of the nodes 10', and the power lines 24 and 25 requiring no connecting polarization, a node 10' can only be miswired with its data terminal DT connected to a power line 24 or 25. We include a feature in our system which allows a miswired node 10' to detect that it is miswired and to provide a visual indication of it.

Since every miswire condition results in AC power applied to data terminal DT, we can use the AC power improperly applied to data terminal DT to provide temporary power for operating the microprocessor mP. We provide diodes D3 and D8 to temporarily substitute for one of the diode pairs D4–D6 or D5–D7 in forming the bridge rectifier 33 providing operating DC power to interface circuit 11' and microprocessor mP. Diode D3 has its anode connected to data terminal DT and its cathode connected to line 27. Diode D8 has its cathode connected to data terminal DT and its anode connected to line 28. This connection of diodes D3 and D8 between data terminal DT and lines 27 and 28 is what we call bridge configuration for them. Bridge configuration for diodes D3 and D8 means that they can function with either diode pair D4–D6 or diode pair D5–D7 to form a full wave bridge circuit receiving AC power at one of the terminals PT1 or PT2, and at terminal DT, to provide full wave rectified DC power at terminals 27 and 28. Microprocessor mP can then provide an appropriate indication using LED D13, for example by periodically placing switch 34 in conduction to create a recognizable flashing pattern for LED D13. However, it is not a trivial process for microprocessor mP to detect a miswire. The firmware controlling microprocessor mP operation must, as explained in connection with FIGS. 4a and 4b, make sophisticated tests to sense miswiring.

Figure 3:
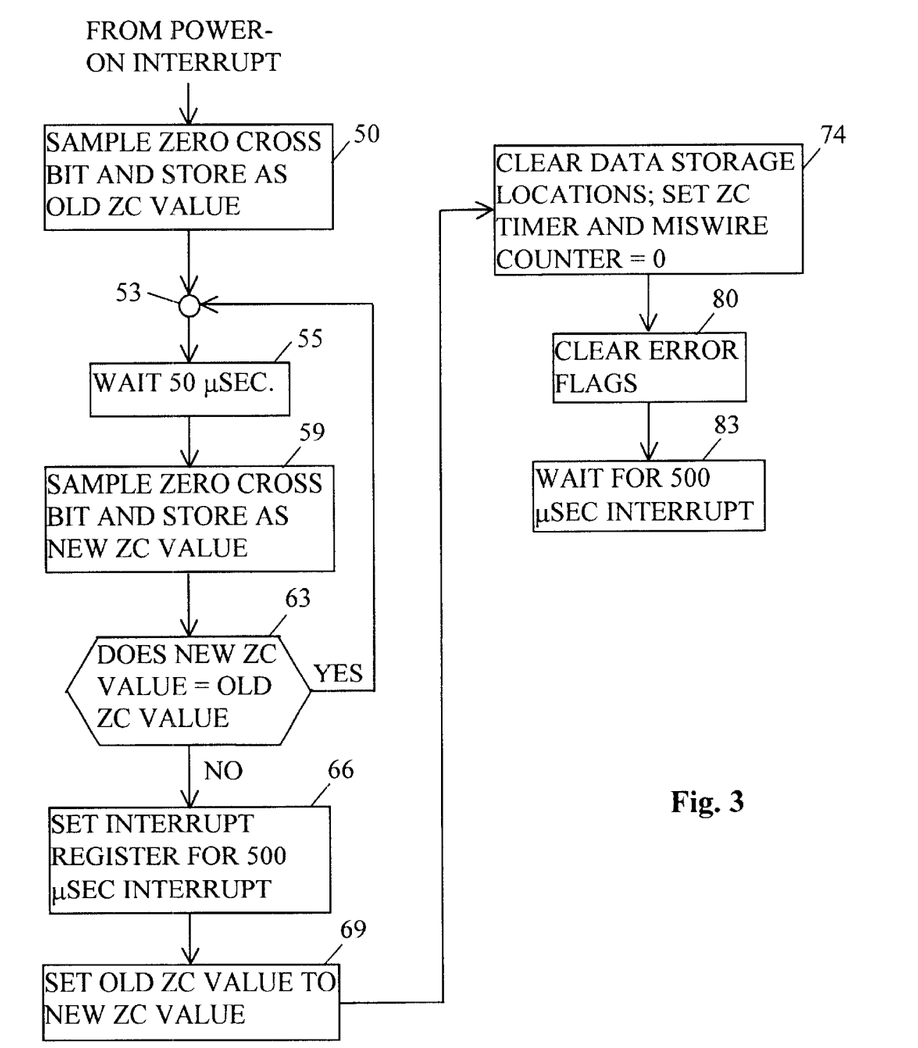
FIG. 3 is a flow chart of software implementing the startup functions of the FIG. 2 circuitry.
Figure 4A:
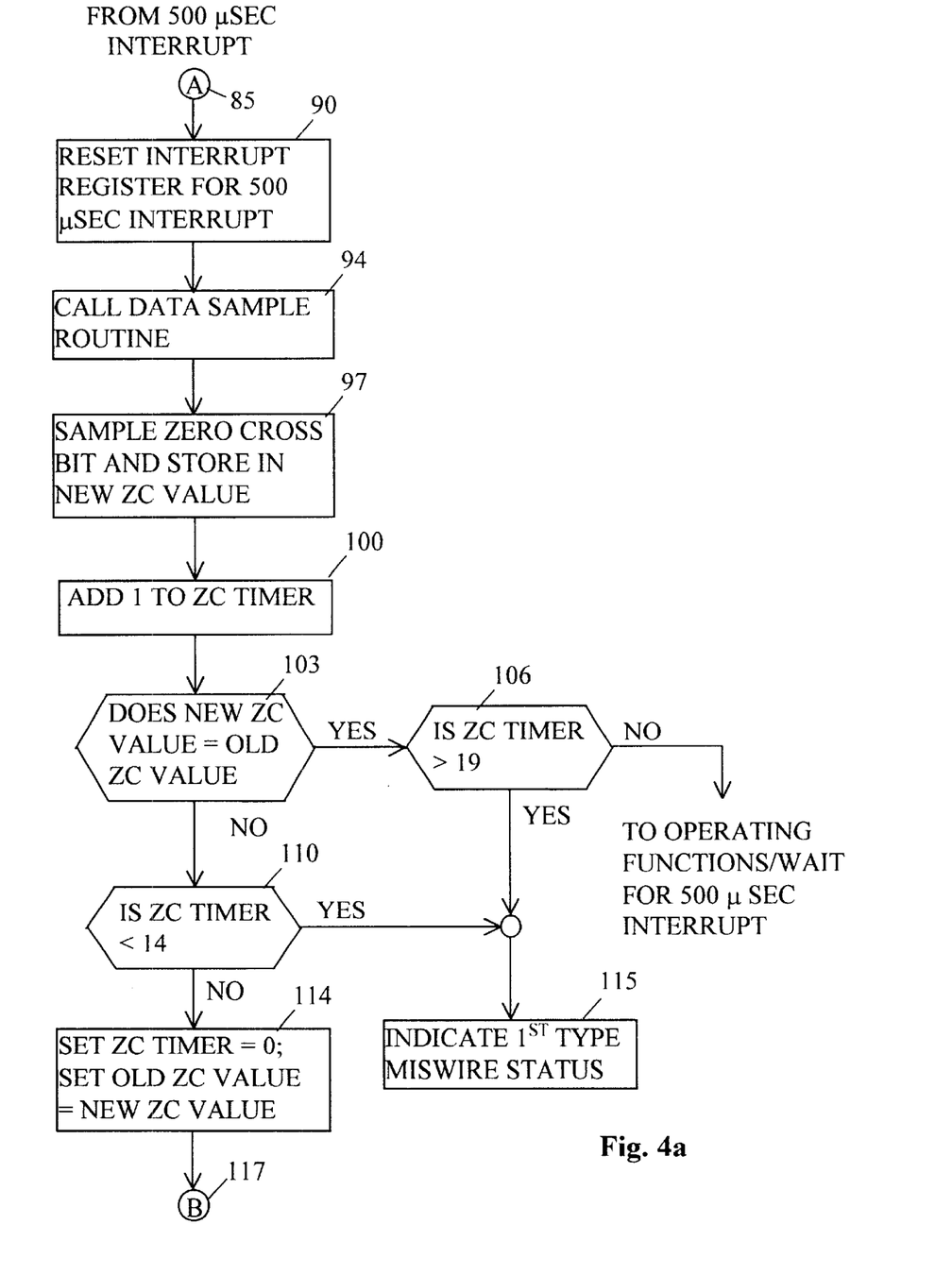
FIGS. 4a and 4b are a flow chart of software implementing operating functions of the FIG. 2 circuitry.
Figure 4B:
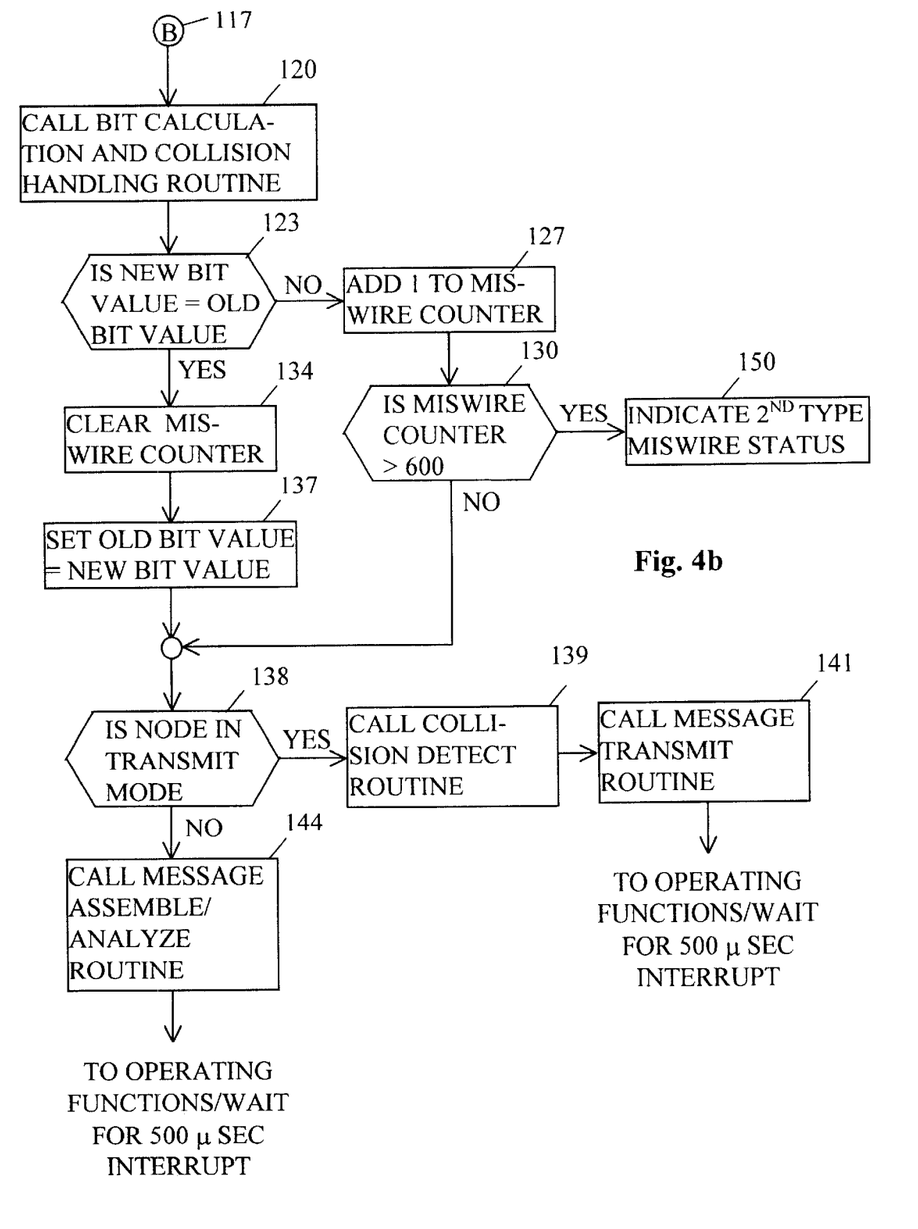

It is useful to generally discuss the flow charts of FIGS. 3, 4a, and 4b and the two types of symbol boxes in them. These flow charts describe the functions of software stored in instruction memory IM of FIG. 2 and which implements various functions of node 10' including those of the invention. Each symbol box represents one or more microprocessor instructions. The lines with arrows connecting the boxes signify the order in which the instructions symbolized by the boxes are to be executed, with the flow of instruction execution following the direction of the arrowheads. Rectangular boxes as at 50 are activity elements. Hexagonal boxes as at 63 are decision elements and have two paths labeled "YES" and "NO" from them to two further symbol boxes. Decision element instructions test some mathematical characteristic of a specified variable. Depending on the test result, instruction execution can either continue in sequence or take a path to another symbol box specified by the results of that test. Here too, a decision element symbolizes one or more instructions that test the specified arithmetic or logical value and causes branching of the instruction execution depending on the result of that test. The instructions that an activity or decision element symbolizes cause the microprocessor $\mu$P to become during execution of those instructions, the functional equivalent of a physical device that performs the stated function. Accordingly, one can describe and claim the invention using terms describing these physical devices.

Note there are many different specific embodiments of these physical devices that all provide identical functionality. We wish to include all of these different embodiments in the definition of our invention.

These flow charts also have connector elements as at 53 which designate a point in the software to which another instruction transfers instruction execution out of normal sequence. Connector elements also designate continuity from one FIG. to the next.

The elements of FIG. 3 symbolize software that synchronizes operation with the zero crossings of the AC wave on conductor PT2 (FIG. 2). Activity element 50 samples the voltage carried on terminal 37 and records this value as high or low in the memory element ME designated for storing an old ZC value. Activity element 55 symbolizes instructions delaying instruction execution for 50 $\mu$sec. This delay may be implemented using the interrupt function. Execution then passes to activity element 59 that again samples the voltage at terminal 37 and again records the value as high or low in a second memory element designated for storing a new ZC value. A decision element 63 symbolizes instructions next executed, and that test the stored old ZC value and the stored new ZC value to be equal. Equality indicates that there has been no change in the ZC signal level since the last sample, and hence there has been no zero crossing by the power voltage on conductor PT2. Where the new and old values of the ZC signal are equal, the sequence of instruction execution transfers back to connector element 53 and activity element 55. This loop continues until the old and new ZC signal levels are different, indicating that the AC waveform has had a zero crossing within the last 50 $\mu$sec. These steps or actions synchronize the system with the AC waveform.

After synchronizing, the instructions symbolized by the remaining elements of the FIG. 3 flow chart perform setup functions for certain variables and other values used during the normal communication activities conducted by executing the instructions of FIGS. 4a and 4b. Activity element 66 sets the time interval field TI of interrupt register IR to the value corresponding to 500 $\mu$sec. and the interrupt address field AD to designate the instruction following connector element A 85 in FIG. 4a. The elements through element 80 symbolize instructions that can be executed within the 500

μsec. nominal interrupt interval. This allows the setup functions to complete before the 500 μsec. interrupt occurs. Decision element 69 sets the old ZC value to the new ZC value. Activity element 74 clears data storage locations forming a part of the memory element ME that serve as data detect registers and as a ZC timer register, all needed for normal communication processing functions. Activity element 80 clears data storage locations forming a part of the memory element ME that serve as error flags needed to indicate certain error conditions detected during communication processing. Activity element 83 then causes microprocessor mP to enter a wait state that exists until the 500 μsec. interrupt occurs.

In describing the operation of microprocessor mP while executing the FIGS. 4*a* and 4*b* instructions, it is helpful to first explain the theory of operation. We have already alluded to the potential for miswires with systems built according to this invention. Executing the instructions associated with the FIGS. 4*a* and 4*b* flow chart elements often detects miswires and provides visual indication of miswires. There are two types of miswires. The first type (type one) has the data line 23 connected (improperly) to power terminal PT2 and power line 25 connected to data terminal DT. In the second type of miswire (type two), the data line 23 is connected (improperly) to power terminal PT1 and power line 24 connected to data terminal DT. These must be handled differently because in the first, there is no AC power-based synchronizing signal available at terminal 37. In the second type of miswire, a power line is connected to terminal PT2 and a synchronizing signal is present at terminal 37. We assume that a power line voltage will overwhelm any data signal applied to data terminal DT.

To detect a miswire of the first type, the software uses the microprocessor μP interrupt function to measure the times between the zero crossings of the voltage at terminal PT2. Nominally, each of these time intervals should be very close to 8.33 ms. because the AC wave frequency is very precisely maintained at 60 Hz. by the power company. When data conductor 23 is connected to terminal PT2, it is certain that zero crossings at terminal PT2 will occur irregularly if at all. This is because data is carried on path 23 by modulating a positive DC voltage to vary between approximately 0 v. and +5 to +8 v. The actual modulation times will be more or less random, and depend on the data content of another transmitting node, or there will be no modulations if no node is transmitting. It is convenient to use the 500 μsec. data terminal DT sampling interval to provide the timing. Miswires can be reliably detected by measuring the lengths of these time intervals between zero crossings. We have found that it is sufficient to measure the times between zero crossings by counting the data sampling interrupt and testing the count as each zero crossing is detected to fall outside of a predetermined range. This is true in spite of the ±10% potential error in the interrupt interval and in spite of the inaccuracy resulting from measurement in 500 msec. increments. For the parameters as specified for this embodiment, a number of counts less than 14 or greater than 19 indicates a miswire or other malfunction.

This range is determined as follows. If the data sample interrupt is precisely 500 μsec., the count for 8.33 ms. will be either 16 or 17, depending on when in the sampling interval the earlier of the zero crossings occurred. The ±10% error adds as much as 833 μsec. further error to the time interval between zero crossings, as measured, which by rounding up becomes 1 ms. or two counts. Subtracting two from 16 and adding two to 17 gives the specified range of 14 to 19 as indicating an accurate synchronizing signal at terminal 37 and hence no miswire or other malfunction. Thus a count less than 14 or greater than 19 indicates a miswire or other malfunction.

In the second type of miswire, data line 23 is connected to power terminal PT1 and power line 24 is connected to data terminal DT. In this miswire situation, a synchronizing signal is available at terminal 37. The signal at data terminal DT appears as an alternating logical high voltage and logical low voltage during the positive and negative halves of the AC wave applied to terminal DT. This can be detected quite easily to indicate the second type of miswire. It is also possible to detect the first kind of miswire by using this methodology, but we do not prefer to do so at this time for at least two reasons. In the first place, there is no reliable synchronizing signal when data line 23 is connected to power terminal PT2. This means that the 500 msec. sampling interrupt would have to be used to sense the signal voltage at data terminal DT as comprising an AC wave, which requires a much larger and more complicated set of instructions to implement. Secondly, we find that evaluating the data to determine that it is consistent with the AC wave takes several seconds, so the opportunity for half of the miswires to be immediately evident is helpful.

To determine the second type of miswire, we simply monitor the data at data terminal DT for deviation from the regular alternations of logical low to high to low voltage in successive bit times. Each message has three identical logical voltages at the end, which assures a break in the logical voltage alterations. Because the system is designed to allow a message as long as 600 bits this means that 597 consecutive bits could theoretically have the alternating low high format. Accordingly, counting 600 successive low to high to low voltage transitions indicates certainty that a power line 24 or 25 is connected to data terminal DT. As a practical matter, it is extremely unlikely to ever see a sequence of even a few tens of alternating logical voltage levels, so a quicker test of say 30 or 50 consecutive alternations may be sufficient.

Turning next to a detailed explanation of the software flow charts of FIGS. 4*a* and 4*b*, the 500 msec. sampling interrupt to connection element 85 in FIG. 4*a* begins normal communication processing. Executing the instructions of software elements 90, 97, 103, and 114 cause microprocessor mP to function as a phase detector that provides a synchronizing signal having level changes in predetermined time relationship to the zero crossings by the AC waveform. The instructions of activity element 90 reset the time interval field in interrupt register IR to again specify 500 msec. The instructions of activity element 94 then call a data sample routine whose execution converts microprocessor mP to a data sampler element. Since the high voltage level on conductor DT is full wave unfiltered DC, the beginning and end of each high voltage level bit interval is briefly a low voltage level. The data sample routine is called to record the voltage level on the conductor DT voltage at each 500 msec. data sample interrupt throughout each bit interval, and performs computations each time when called that eventually determine the actual logic value of the voltage signal during that bit interval. When a zero crossing is detected signaling the end of the bit interval, the data sample routine has already placed the determined value of the logic level for the bit interval in one of the data storage locations forming a part of memory element ME. Other than the synchronization with the start of each bit interval, this voltage reading and logic level determination is not a part of this invention, and need not be discussed in any further detail. Some of the data storage locations cleared by the instructions which activity element 74 symbolizes are used by the data sample routine.

The instructions of activity element 97 are then executed. These sample the current ZC voltage value at terminal 37 and record this logic al high or logical low voltage value as the new ZC value. Activity element 100 instructions then increment the ZC timer value by one. Decision element 103 compares the new ZC value sensed at terminal 37 to the old ZC value. When these have the same logical value, which corresponds to no zero crossing by the AC wave on conductor PT2 during the most recent 500 msec. interval, execution continues with the instructions of decision element 106.

Executing the instructions of software elements 100–114 causes microprocessor mP to function as a synchronizing (sync) signal tester to for measuring interval lengths between successive sync signal level changes. The sync signal tester compares the measured interval length between successive level changes to a predetermined range of lengths and if the interval length is not within this range, signals this situation. The sync signal tester includes a timing element provides a timing test signal having a first level change after approximately 7 ms. and a second level change before about 9.5 ms. The sync signal tester tests the time intervals between successive ZC signal changes.

As explained earlier, from 14 to 19 counts inclusive in the ZC timer indicate a proper interval length between successive zero crossings. Decision element 106, whose instructions form part of a first testing element, determines whether there has been a change in the ZC bit value within approximately the last 9.5 ms. No change is the normal or no error condition; when this is sensed, instruction execution is transferred to other software routines that perform various operating functions such as reading attached sensors, controlling attached equipment, etc. while waiting for the next 500 msec. interrupt. If the value recorded in the ZC timer is 20 or greater as tested by element 106, this means that there has been no change in the ZC voltage at terminal 37 within the last 10 ms. This condition is an error frequently caused by a miswire of the first type, and instruction execution transfers to an error indicator routine symbolized by activity element 115 which uses LED D13 to signal this event. The details of the error indication are not important. In one form, a preset flashing pattern by LED D13, say one 2 sec. flash, a one sec. pause, and then a 0.5 sec. flash with a one sec. pause, indicates that an error condition has been detected which may be a miswire of the first type. A technician can perhaps infer the problem from the LED D13 flashing pattern and make corrections.

When the voltage at terminal 37 is detected as having changed, the instructions of decision element 103 will transfer instruction execution to decision element 110, which is also a part of the first testing element. Element 110 symbolizes instructions that test the ZC timer to be less than 14. If there has been a zero crossing in less than approximately 7 ms. as measured, this too indicates a malfunction, likely a miswire of the first type, and instruction execution is transferred to activity element 115 to generate the flashing pattern.

The effect of the logic in the instructions of decision elements 103, 106, and 110 is to signal errors in the time between successive zero crossings, and if no error is detected to continue with execution of instructions symbolized by activity element 114. These instructions reset the ZC timer to 0 and set the old ZC value to the new ZC value to prepare for testing the length of the interval between the just finished zero crossing and the one that should follow. Instruction execution then proceeds with instructions symbolized in FIG. 4*b*, as indicated by connection element B 117. At this point, all of the data signal voltage sampling for the bit interval has been completed. This point in instruction execution is reached whenever there has been a level change in the sync signal. Further instruction execution is in response to this change in the sync signal level.

The instructions of FIG. 4*b* test for miswires of the second type. The instructions of software elements 123–137 collectively transform microprocessor mP into a data tester element. In FIG. 4*b*, the instructions of activity element 120 transfer instruction execution to a bit valuation routine that determines the value of the most recent bit transmitted. The bit valuation routine returns this most recent or new bit value to the instructions of decision element 123 and following elements. Both the new bit value and an old bit value are held in memory element ME locations to which have been assigned the associated names. Decision element 123 tests the most recent bit value against the value of the preceding (old) bit. As previously explained, when the AC line 24 and data line 23 are interchanged in the connection to terminals PT1 and DT, the AC power waveform appears as an alternating logical high and logical low voltage at terminal DT. If the new and old values are equal, this eliminates the possibility that a second type miswire exists, and the execution proceeds with the instructions of activity elements 134 and 137. Element 134 instructions clear the miswire counter recorded in counter element CE. The instructions of activity element 137 are executed next; these set the old bit value to the new bit value in the memory element ME.

If the values of the two most recent bits are sensed by decision element 123 to be different, the instructions of activity element 127 are executed next. These add one to the value stored in the miswire counter. Any delta values other than one can be used, but one is the most convenient. Then the instructions of decision element 130 are executed. The instructions of decision element 130 comprise a comparison element that tests the miswire counter value. If the miswire counter is greater than 600 the software may have detected a second type miswire, inferred because the last 600 consecutive bits received at data terminal DT have been alternating high and low logic voltages. This condition causes a branch to the instructions of activity element 150, which cause microprocessor mP to function as a second error indicator that indicates the second type of miswire error. As with activity element 115, activity element 150 provides a recognizable flashing pattern indicating a type two miswire. If the miswire index is less than or equal to 600, a type two miswire has not been sensed, and instruction execution advances to decision element 138.

Decision element 138 tests a transmit/receive flag to detect whether node 10' is in transmit mode. (When data transmission is active, the transmit/receive flag is set to indicate that condition, and when the transmission is complete, the flag is changed to indicate that node 10' is in receive mode.) Collisions need be detected only when transmit mode is active, of course. Activity element 139 calls a collision detect routine. Activity element 141 calls a message transmit routine, which transmits the next bit of the message. Then instruction execution advances to perform normal operating functions and to wait for the next 500 msec. interrupt.

If the node is not in transmit mode, the instructions of activity element 144 are executed, which assembles the message for processing as needed and analyzes the message for further actions, which the message may request. Then instruction execution advances to perform normal operating functions and to wait for the next 500 msec. interrupt.

We wish to mention again that the hardware of FIGS. 1 and 2 is only one example of circuitry providing the stated functionality. The software defined by the flowcharts of FIGS. 3, 4a, and 4b can take a variety of specific forms and yet provide equivalent functions. Similarly, the individual software elements in these flowcharts can represent a variety of different instruction sets. We wish the claims following to be interpreted to cover all of these equivalent hardware and software embodiments.

What is claimed is:

1. In a system of the type having a plurality of nodes for communicating with each other through messages carried by a data signal comprising a series of data bits sent and received on a data line respectively to and from a data terminal of each node connected to the data line, said data bits encoded in dominant and recessive signal levels of the data signal corresponding to binary values and by which each said node resolves collisions of messages sent by more than one node, each said node for receiving an AC waveform at an AC power terminal from an AC power line, wherein each said node includes:

a) a power supply for providing DC power at first and second DC power terminals for operating the node and for communicating through the data line with the other nodes, said second DC power terminal voltage level corresponding to the dominant signal level;

b) an interface circuit comprising i) a pull-up impedance connected between the first DC power terminal and the node's output data terminal, and ii) a variable impedance connected between the node's output data terminal and the second DC power terminal and having a control terminal, said variable impedance providing a first impedance value substantially smaller than the pull-up impedance value responsive to an output data signal at the control terminal having a first level, and an impedance substantially larger than the pull-up impedance value responsive to a second level of the output data signal at the control terminal, wherein said variable impedance's first impedance value holds the data line voltage level substantially at the dominant signal level irrespective of the impedance of the variable impedances in other nodes;

c) a phase detector receiving the AC power terminal waveform and providing a synchronizing signal having level changes in predetermined time relationship to predetermined points in the AC power terminal waveform; and d) a signal generator receiving the synchronizing signal and providing the output data signal to the control terminal, said output data signal changing levels in predetermined time relationship to the level transitions in the synchronizing signal.

2. The node of claim 1, wherein the power supply includes first and second AC input terminals for receiving AC power from the AC power line; wherein the power supply is of the type converting the AC power to the DC power provided at the power supply DC power terminals, and wherein the phase detector comprises a resistor having first and second terminals, with the resistor first terminal connected to the first AC input terminal, and a zener diode connected between the resistor second terminal and the second AC input terminal, said resistor second terminal providing the synchronizing signal with level changes responsive to the AC power waveform crossing at least one predetermined voltage level.

3. The node of claim 2, wherein the phase detector is of the type providing a synchronizing signal changing levels in time relation to the AC power waveform zero crossing.

4. The node of claim 3, including a data sampler receiving the data signal at the data terminal, said data sampler starting a series of data signal level samplings in time relationship to a synchronizing signal level change, recording the sampled data signal levels, determining a data bit value from the recorded data signal samples responsive to the synchronizing signal level change next following, and recording the determined data bit value in a memory element.

5. The node of claim 3, wherein the signal generator comprises a microprocessor having a synchronizing data terminal receiving the synchronizing signal, and an instruction memory in which are recorded a plurality of sampling instructions and a plurality of output data instructions, said microprocessor periodically executing the sampling instructions, said sampling instructions causing the microprocessor to sense the voltage level at the synchronizing data terminal, and responsive to a synchronizing signal voltage level change, said microprocessor executing the output data instructions.

6. The node of claim 5, wherein said microprocessor includes an alterable memory location and an output data terminal, and circuitry responsive to execution of the output data instructions for applying to the output data terminal a voltage level dependent on data within the alterable memory location.

7. The node of claim 2, wherein the power supply comprises first through fourth diodes forming a bridge circuit, and wherein the node farther comprises e) fifth and sixth diodes connecting the data terminal in bridge configuration to the first and second DC power terminals;

f) a first error indicator providing a humanly discernable error indication responsive to a first error signal; and g) a synchronizing signal tester receiving the synchronizing signal and measuring interval lengths between successive synchronizing signal level changes, and comparing said measured interval lengths with a predetermined range of interval lengths, and providing the first error signal responsive to a measured interval length falling outside of said predetermined range of interval lengths.

8. The node of claim 7, wherein the synchronizing signal tester includes i) a timing element receiving the synchronizing signal and providing a timing test signal having a level change a predetermined time after a first change in the synchronizing signal level change; and ii) a first testing element receiving the synchronizing signal and the timing test signal, and responsive to a predetermined difference of the time between the timing test signal level change and the synchronizing signal level change next following the first change in the synchronizing signal level change, providing a first error signal to the first error indicator.

9. The node of claim 8 for use with AC power having a predetermined nominal time between zero crossings, wherein the phase detector provides a synchronizing signal having times between level transitions approximately equal to the predetermined nominal time between zero crossings of the waveform applied to the AC power voltage, and wherein the first testing element is of the type having a predetermined deviation of the time of the level change in the timing test signal after a change in the synchronizing signal level change that is at least one of approximately 30% less than the predetermined nominal time and 30% greater than the predetermined nominal time.

10. The node of claim 9, including h) a second error indicator providing a humanly discernable error indication responsive to a second error signal; and j) a data value tester including
  i) a memory element recording a data signal level encoded in a bit value signal;
  ii) a counter element recording a count value and providing a count signal encoding the count value, and altering the count value by a predetermined delta value responsive to an alter count signal, and setting the count value to a predetermined cleared value responsive to a clear count signal;
  iii) an analyzer element receiving the data signal and the synchronizing signal, and responsive to level changes in the synchronizing signal providing an alter count signal to the counter element, and comparing the most recent level of the data signal to the data signal level recorded in the memory element, and if logically identical, providing a clear count signal to the counter element, and then in any case providing a bit value signal to the memory element encoding the most recent level of the data signal; and
  iv) comparison element receiving the count signal and providing a second error signal to the second error indicator responsive to the count value encoded in the count signal reaching a predetermined fault value different from the cleared value.

11. The node of claim 10, wherein the message has a maximum predetermined number of bits, and wherein the comparison element has a predetermined fault value at least equal to the maximum predetermined number of bits in the message.

12. The node of claim 2, wherein the power supply comprises first through fourth diodes forming a bridge circuit, and wherein the module further comprises
  e) fifth and sixth diodes connecting the data conductor in bridge configuration to the first and second DC power terminals;
  h) a second error indicator providing a humanly discernable error indication responsive to a second error signal; and
  j) a data value tester receiving the data signal and testing the sequence of level changes in the data signal.

13. The node of claim 12 wherein the data value tester comprises:
  i) a memory element recording each data signal bit level responsive to a bit value signal;
  ii) a counter element recording a count value and providing a count signal encoding the count value, and altering the count value by a predetermined delta value responsive to an alter count signal, and setting the count value to a predetermined cleared value responsive to a clear count signal;
  iii) an analyzer element receiving the data signal and the synchronizing signal, and responsive to level changes in the synchronizing signal providing an alter count signal to the counter element and comparing the most recent level of the data signal to the data signal level recorded in the memory element, and if logically identical, providing a clear count signal to the counter element, and then providing a bit value signal to the memory element encoding the most recent level of the data signal; and
  iv) a comparison element receiving the count signal and providing a second error signal to the second error indicator responsive to the count value encoded in the count signal reaching a predetermined fault value different from the cleared value.

14. The node of claim 13, wherein the counter element has a delta value of +1 and a cleared value of zero, and wherein the comparison element provides a second error signal to the second error indicator responsive to the count value encoded in the count signal reaching at least 600.

15. The node of claim 13, wherein the message has a maximum predetermined number of bits, and wherein the comparison element has a predetermined fault value at least equal to the maximum predetermined number of bits in the message.

* * * * *